Dec. 13, 1966  I. HOROWITZ ETAL  3,291,522
PLAY EQUIPMENT SEAT
Filed Oct. 5, 1965  3 Sheets-Sheet 1
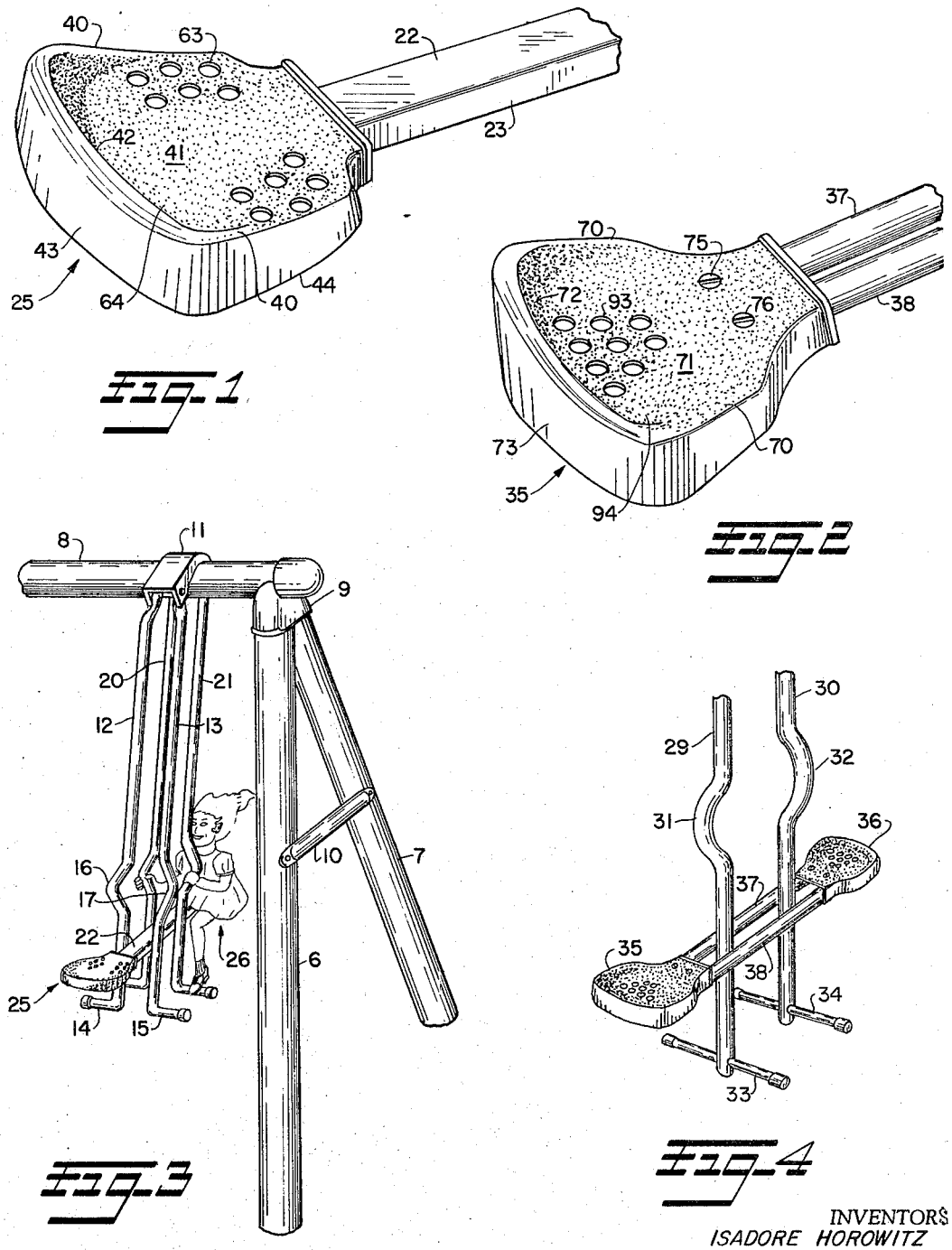
INVENTORS
ISADORE HOROWITZ
EMANUEL S. SMYRNI
BY  Strauch, Nolan, Neale,
Nies and Bronaugh
ATTORNEYS

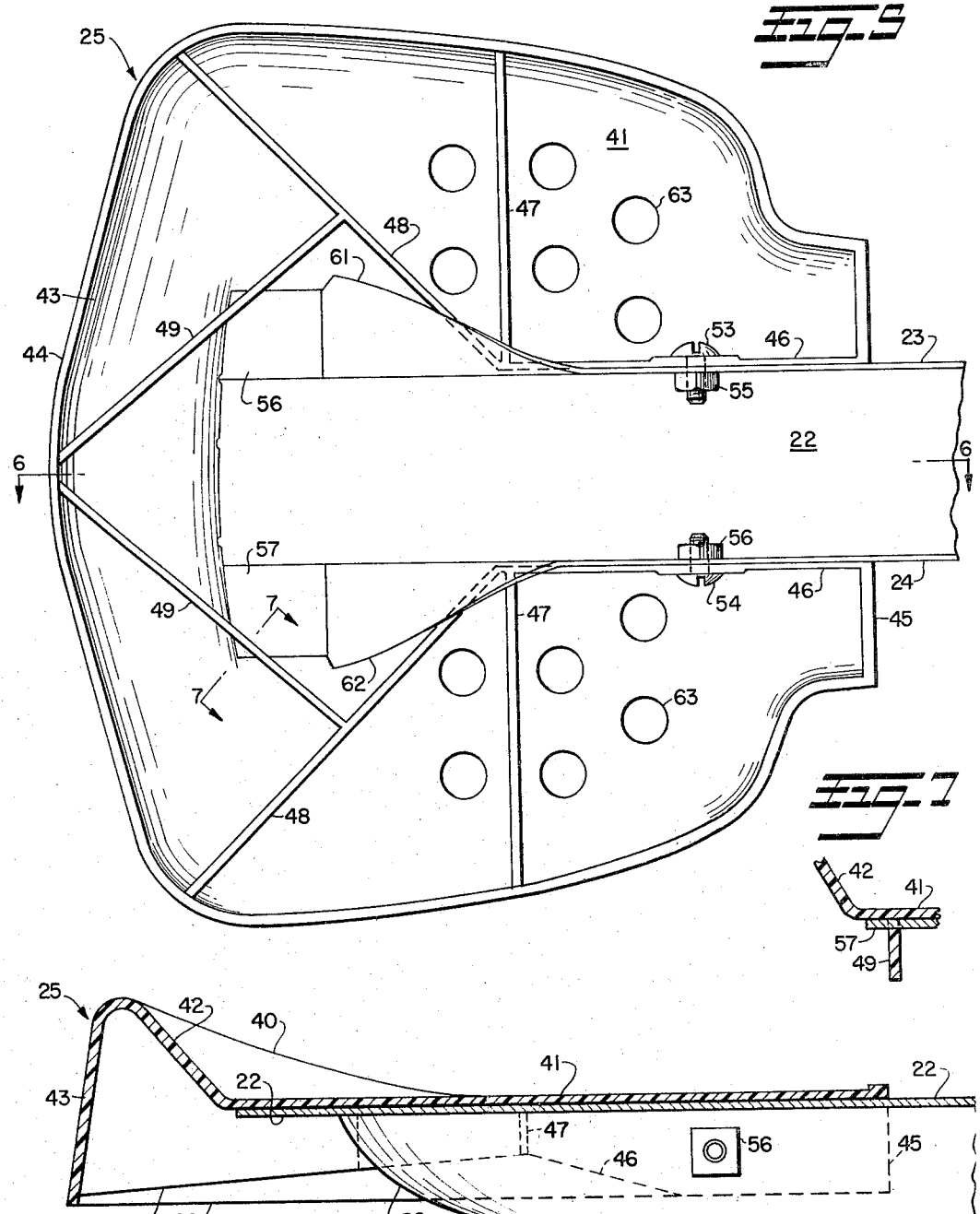

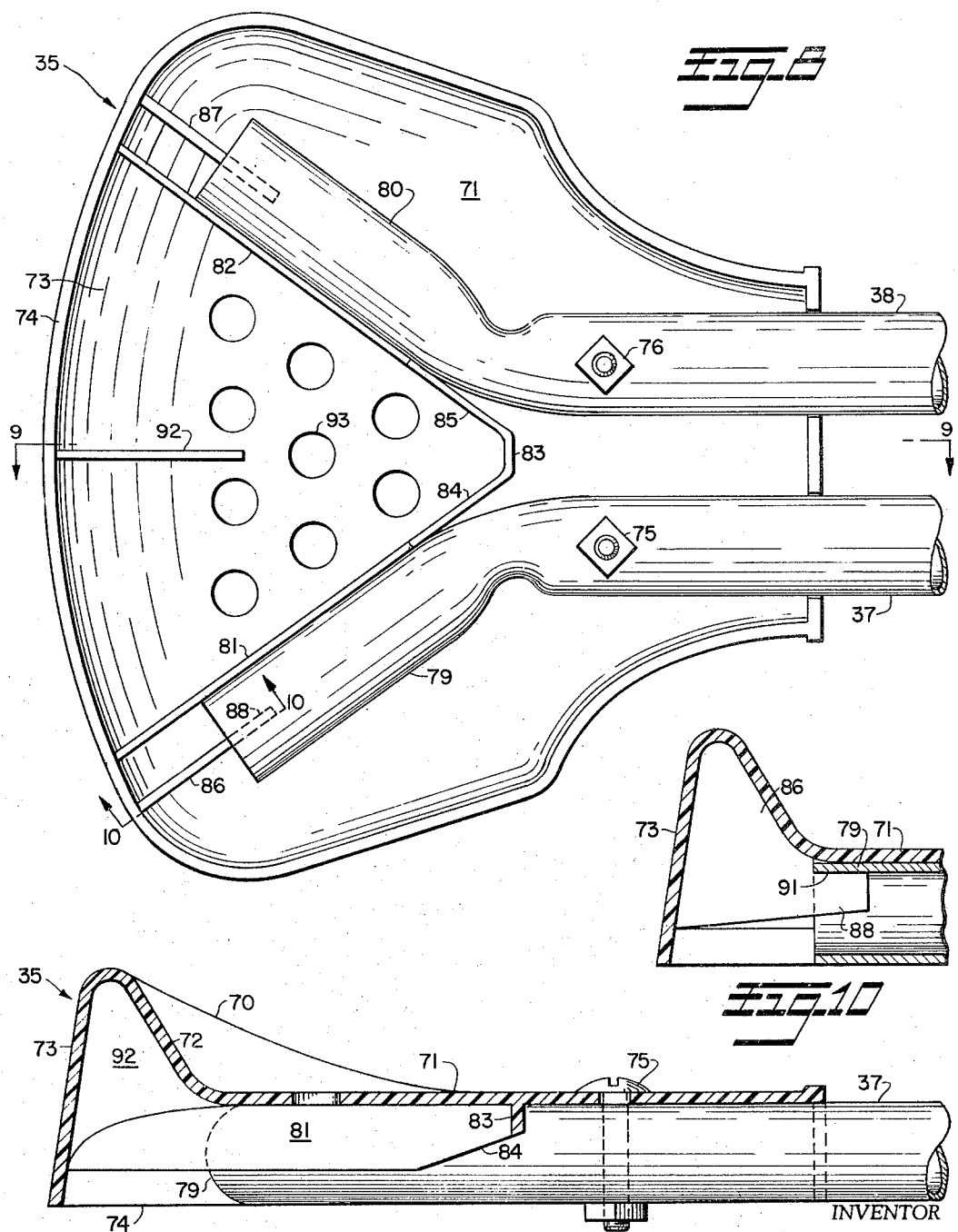

United States Patent Office 3,291,522
Patented Dec. 13, 1966

3,291,522
PLAY EQUIPMENT SEAT
Isadore Horowitz, Shreveport, and Emanuel S. Smyrni, Bossier City, La., assignors to Gym-Dandy, Inc., Bossier City, La., a corporation of Louisiana
Filed Oct. 5, 1965, Ser. No. 493,025
4 Claims. (Cl. 297—195)

The present invention relates to play equipment, and more especially to the provision of light weight and long life plastic seat structures particularly adapted for use with certain pieces of play equipment.

Seats for children's play equipment have commonly been made of wood or metal and since the play equipment is left outdoors and exposed to variable weather conditions the seats are subject to paint peeling, wood cracking, and rusting in the case of metal seats. They are relatively heavy, and both types need painting both for original appearance and for maintenance.

The present invention provides a molded plastic seat of high density polyethylene plastic that is virtually indestructible, light weight, and which does not need initial or maintenance painting since the color is built in and extends throughout the thickness of the seat. It is configured and has internal webbed bracing that results in a rigid structure that is readily secured to the equipment with which it is used.

It is accordingly a primary object of the invention to provide a novel molded plastic play equipment seat of high durability and pleasing appearance.

Another important object of the invention is in the provision of a novel plastic seat structure for play equipment which is suitably reinforced to assure resistance to bending and twisting and resultant structural failure.

It is still another object of the present invention to provide a novel plastic seat structure for play equipment which is easily secured to the support with which it is used and which is provided with means interfitting with portions of the support for attachment thereto with a minimum number of separate securing elements.

Other objects will become apparent as the description proceeds in connection with the claims and the accompanying drawings wherein:

FIGURE 1 is a perspective view of a seat in accordance with a first embodiment of the invention, secured to the outer end of a support.

FIGURE 2 is a perspective view of a seat in accordance with a second embodiment of the invention, secured to the outer end of a different kind of support.

FIGURE 3 is a perspective view of one portion of a play equipment set utilizing the first embodiment of the invention.

FIGURE 4 is an enlarged perspective view of a portion of play equipment similar to but differing slightly from FIGURE 3, and utilizing the second embodiment of the invention.

FIGURE 5 is a bottom plan view of the seat and support of FIGURE 1.

FIGURE 6 is a sectional view substantially along the line 6—6 of FIGURE 5, looking in the direction of the arrows.

FIGURE 7 is a sectional view substantially along the line 7—7 of FIGURE 5, looking in the direction of the arrows.

FIGURE 8 is a bottom plan view of the seat and support of FIGURE 2.

FIGURE 9 is a sectional view substantially along the line 9—9 of FIGURE 8, looking in the direction of the arrows, and FIGURE 10 is a sectional view substantially along the line 10—10 of FIGURE 8, looking in the direction of the arrows.

Referring to FIGURE 3 there is shown a portion of a play equipment set comprising a pair of supporting legs 6 and 7 joined at their converging upper ends to a horizontal support 8 by a bracket 9. Brace 10 rigidly connects the legs at approximately their mid-length. A cross-arm 11 is welded to the support 8 and has portions extending perpendicularly to either side thereof.

Hingedly connected to one extending portion of cross-arm 11, as by pins or the like, not shown, are a pair of parallel depending tubular members 12 and 13 which terminate at their lower ends in outwardly extending foot rests 14 and 15. The members 12 and 13 may be bent outwardly away from each other as shown to provide conveniently shaped hand-grips 16 and 17.

On the oppositely extending portion of cross-arm 11 is a similar pair of parallel depending tubular members 20 and 21 which are similarly hinged to the cross-arm and have similar hand grips and foot rests. An inverted U-shaped channel member 22 providing a support for a pair of seats is mounted in a horizontal position between the pairs of legs 12–13 and 20–21 so that it extends at right angles to the support 8. It is connected to the legs 12–13 and 20–21 by pins, not shown, passing through the legs and through the downwardly depending flanges 23 and 24 of the channel member 22, the pins having a loose fit to permit a pivotal connection. At each end of the channel is secured a plastic seat 25 constructed in accordance with one embodiment of the invention. The seat on the right end of FIGURE 3 is not visible since a child 26 is shown seated upon it.

In operation there may be a child upon only one seat as shown in FIGURE 3, or there may be one on each seat. Because of the parallel arrangement of the depending tubular members 12–13 and 20–21 and the fact that the pivotal connections at their upper ends are parallel to the channel member 22 the whole arrangement may swing back and forth in a plane perpendicular to the support 8 by the forces exerted by the child's hands and feet upon the hand grips and foot rests. The channel member 22 will remain horizontal during its swinging movements.

A similar equipment is shown in FIGURE 4, but in this case there are only two depending legs 29 and 30, one on each side of the horizontal support 8, as will be understood. The depending legs have hand grips 31 and 32 and foot rests 33 and 34. Instead of a channel member for mounting the seats 35 and 36 they are mounted upon a pair of spaced parallel tubes 37 and 38 on opposite sides of the depending legs 29 and 30, there being pins, not shown, to provide a pivotal connection as in FIGURE 3, and the tubes 37 and 38 will remain horizontal during swinging movements. The outer ends of the tubes 37 and 38 form seat supports and are bent outwardly and away from each other as will be described later, and as shown in FIGURE 8, and the seats illustrate a second embodiment of the invention.

The embodiment of the seat used with the channel member of FIGURE 3 is shown in enlarged detail in FIGURES 1, 5, 6 and 7. As best shown in FIGURES 1 and 6 the seat 25 comprises a substantially planar top portion 41 which at the rear of the seat, or beyond the outer end of the channel member 22 terminates in an upwardly and rearwardly extending hump 42 which extends partially around to the sides as indicated at 40 in FIGURE 6. The seat thus has a configuration somewhat like a saddle. Beyond the top of the hump 42 the seat has a downwardly depending flange 43 which flange is continuous around the periphery of the seat, the bottom edge 44 of the peripheral flange being substantially in a common plane, as best shown in FIGURE 6. The front wall 45 is interrupted to provide passage of the channel member 22, and at the edges of the interruption there are a pair of rearwardly extending vertical stiffening webs 46 which terminate at their intersection with perpendicularly outwardly extending vertical stiffening webs 47 and diagonally outwardly extending vertical stiffening webs 48.

Substantially at their mid-lengths the webs 48 are joined by diagonally inwardly extending vertical webs 49 which meet the flange 43 near the center line of the seat at the back thereof.

All of the webs 46, 47, 48 and 49 are molded integrally with the seat and are integral where they meet each other. They extend vertically downwardly from the bottom inner surface of the seat. While they may all extend downwardly to or below the plane of the bottom edge 44 of the peripheral flange they need not do so to provide the needed stiffening and rigidity to the seat. For a portion of their lengths the webs 46 extend to the plane of the bottom edge 44 then they taper as shown at 46 to a depth equal to that of the intersecting webs 47. Webs 48 and 49 taper downwardly from the points where webs 49 intersect webs 47, as shown in FIGURE 6, and at their rearward ends are almost as deep as the peripheral flange 43. The channel member 22 is nested between the stiffening webs 46 and the inner surface of the seat, and a pair of bolts 53 and 54 pass through the flanges 23 and 24 of the channel member 22 and then through the webs 46 and are secured by nuts 55 and 56. This provides two points of attachment between the channel member and the seat.

At its rear, or left end as viewed in FIGURE 5, the flanges 23 and 24 are flattened out so that they are coplanar with their connecting web and thus lie flat against the under surface of the planar seat portion 41. These flattened portions are designated by the reference numerals 56 and 57 and protrude through openings in the stiffening webs 49 where the webs join the under surface of the seat portion 41. Referring to FIGURE 5, the outwardly flaring transition sections of the flanges 23 and 24 between their vertical portions and their flattened portions are indicated by the reference numbers 61 and 62. The fit of the flattened portions 56 and 57 is snug within the openings within the webs 49, and so besides being secured to the channel member 22 by the bolts 53 and 54 the seat is also secured thereto by the flattened portions 59 and 60 which are farther to the rear of the seat, and the connections at this point are farther apart than the connections at the bolts. There is thus provided a rigid mounting of the seat 25 upon the seat support or channel member 22. The seat will not twist or turn upon the seat support and the seat itself will not twist or deform because of the rigidity provided by the peripheral depending flange and the vertical stiffening webs 46, 47, 48 and 49 all of which are integrally molded to the seat and to each other where they join.

In assembling a seat 25 upon a channel member 22 the channel member is nested or placed between the webs 46 a little to the right of the position shown in FIGURE 5. Then it is moved to the left until the flattened portions 59 and 60 of the flanges on the channel member are forced through and snugly seated in hte slots in the webs 49. The openings through the seat webs 46 and the flanges 23 and 24 of the channel member are now aligned and the bolts 53 and 54 are inserted and secured by the nuts 55 and 56.

The planar seat top portion 41 has a series of holes 63 therethrough which provide drainage and also increase the friction between the seat and the user thereof, to reduce the danger of slipping off. The holes 63 are so located that they are not in alignment with any of the stiffening webs of the seat. In order to further increase the friction between the seat and the user thereof the upper or outer surface of the seat is roughened or stippled as indicated by reference number 64.

The other embodiment of the seat, used with the suspension system of FIGURE 4 is shown in enlarged detail in FIGURES 2, 8, 9 and 10. The seat 35 (or 36) has a substantially planar seat top portion 71 terminating at its rear end portion in an upwardly inclined hump 72 that extends partially around the two sides of the seat at 70, and terminates in a downwardly directed flange 73 which extends around the periphery of the seat and terminates in a bottom edge 74 that lies substantially in a plane tangent to the bottom surfaces of the tubes 37 and 38, which tubes lie snugly against the under or inner surface of the planar seat section 71. The front wall of the flange 73 is interrupted at two points to permit passage of the tubes 37 and 38. The seat 35 is secured to the seat support formed by the outer ends of tubes 37 and 38 in part by nut and bolt assemblies 75 and 76 which pass through the planar section 71 of the seat and then diametrically through the tubes to the right of the point where they are bifurcated away from each other at 79 and 80 as best seen in FIGURE 8. The included angle between the bifurcated portions 79 and 80 of the tubes 37 and 38 is not critical but should be such that they support the seat 35 from beneath at widely separated zones. In the embodiment illustrated in FIGURE 4 the included angle is substantially 72 degrees.

A pair of diagonally extending vertical stiffening webs 81 and 82 extend from the rear of the peripheral web or flange 73 forward to a point where they join a short transverse vertical stiffening web 83. These webs are parallel to and tangentially abut the curved inner surfaces of the bifurcated portions 79 and 80, and lie snugly against them. As best shown in FIGURE 9, the webs 81 and 82 are of lesser height than the peripheral flange or web 73, up to a point where they are no longer in contact with the bifurcated portions 79 and 80, and to the right of this point they may decrease in height as indicated at 84 and 85 until they are the same height as web 83 where they meet it.

A pair of short vertical webs 86 and 87 extend forwardly from the rear portion of the peripheral flange 73, parallel to and outside of the webs 81 and 82. These webs as well as all of the webs shown in FIGURE 8 are integrally molded to the seat 35 which they join at its under inner surface. Webs 86 and 87 are so spaced from the webs 81 and 82 that they are in planes passing vertically and diametrically through the bifurcated portions 79 and 80 of the tubes 37 and 38. At its forward end 88 the web 86 protrudes into the rear end of the bifurcated portion 79 of tube 37, there being a slot 91 in the forward end of the web where it joins the planar seat section 71, as shown in FIGURE 10. The slot 91 is of such width that the rear end portion of the tube has a snug fit therein, and is of such depth that the end of the tube abuts the web 86 at the rear end of the slot. The other web 87 has a similar slot within which the rear bifurcated portion of tube 38 is snugly engaged. Thus besides being attached to the seat 35 by the nut and bolt assemblies 74 and 75, the tubes 37 and 38 are secured to the seat by the slots in the webs 86 and 87 which are more widely spaced than the nut and bolt assemblies and prevent twisting of the seat about the tubes as well as rigidly securing the rear end portion of the seat to the tubes. In affixing the seat to the tubes 37 and 38 the rear ends of the bifurcated ends 79 and 80 thereof are forced into the slots in the forward ends of the webs 86 and 87 until they are fully engaged therein and the sides of the bifurcated ends 79 and 80 engage the sides of the webs 81 and 82. Then the nut and bolt assemblies 75 and 76 are inserted and secured. Another vertical stiffening web 92 extends along the longitudinal centerline of the seat from the rear of the peripheral flange 73 to the rear of the planar seat top portion, as best seen in FIGURE 9. The seat is provided with a series of drain holes 93 and its upper surface is roughened as by having a stippled finish 94.

While the seats have been illustrated in connection with a swing device shown in FIGURES 3 and 4, they are equally useful for seats for see-saws, merry-go-rounds, velocipedes, bicycles or the like.

The invention may be embodied in other specific forms without departing from the spirit or essential characteristics thereof. The present embodiments are therefore to be considered in all respects as illustrative and not restrictive with the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A molded plastic seat for play equipment and the like, comprising:
   (a) a body having a substantially planar central top portion and a depending peripheral flange;
   (b) said body and flange having a front portion and a rear portion, and the front portion of said flange being interrupted to form a passageway therethrough for a seat support;
   (c) a series of stiffening webs integral with said body and extending substantially perpendicularly from said body within said peripheral flange;
   (d) first means toward the rear portion of said body and on the same side of said central top portion as said flange and webs for securing the rear portion of a seat support to said body;
   (e) second means toward the front portion of said body for securing the front portion of a seat support to said body; and
   (f) at least two of said stiffening webs on opposite sides of the center line of said body being provided with slots adjacent the underside of said substantially planar central top portion and substantially parallel to said planar central top portion for the reception of spaced end portions of a seat support to provide securing means for said spaced end portions.

2. In the seat described in claim 1, a pair of stiffening webs paralleling and spaced from said slotted stiffening webs for supporting engagement with portions of a seat support received within said slots.

3. In the seat described in claim 1, a pair of stiffening webs on opposite sides of and parallel to the centerline of said body adjacent its front portion for engagement with the opposite sides of a seat support:

(a) said second securing means for said seat support passing through said last mentioned webs.

4. A molded plastic seat for play equipment and the like, comprising:
   (a) a body having a substantially planar central top portion and a depending peripheral flange;
   (b) said body and flange having a front portion and a rear portion, and the front portion of said flange being interrupted to form a passageway therethrough for a seat support;
   (c) a series of stiffening webs integral with said body and extending substantially perpendicularly from said body within said peripheral flange;
   (d) first means toward the rear portion of said body and on the same side of said central top portion as said flange and webs for securing the rear portion of a seat support to said body;
   (e) second means toward the front portion of said body for securing the front portion of a seat support to said body;
   (f) said body is wider at its rear portion than at its front portion;
   (g) said first means and said second means for securing a seat support to said body each comprises a pair of securing devices transversely spaced on opposite sides of the centerline of said body;
   (h) the pair of securing devices forming said first securing means being more widely spaced than the pair forming said second securing means;
   (i) a seat support engaging the underside of the substantially planar central top portion of said body; and
   (j) said seat support being wider at its rear portion than at its front portion.

References Cited by the Examiner

UNITED STATES PATENTS

| | | | |
|---|---|---|---|
| 1,216,273 | 2/1917 | Brigel | 297—202 |
| 2,558,389 | 6/1951 | Robinson | 297—200 |
| 3,000,669 | 9/1961 | Silverman et al. | 297—451 |
| 3,039,819 | 6/1962 | Williams et al. | 297—277 |
| 3,145,013 | 8/1964 | Grudoski | 272—85 X |
| 3,173,723 | 3/1965 | Hoven et al. | 297—451 |
| 3,199,868 | 8/1965 | Motyka | 272—30 |

FRANK B. SHERRY, *Primary Examiner.*

JAMES T. McCALL, *Examiner.*